United States Patent
Delaney et al.

(10) Patent No.: US 7,353,256 B2
(45) Date of Patent: *Apr. 1, 2008

(54) APPLICATION PROGRAM INTERFACE FOR MESSAGE ROUTING AND MANAGEMENT SYSTEM

(75) Inventors: Jeffrey Delaney, Hudson, NH (US); William H. Kirtley, Boston, MA (US); Robert Kuszewski, Arlington, MA (US); John Andrew Lash, San Francisco, CA (US); Robert Mathews, Somerville, MA (US); David Page, Manchester, MA (US); Martin Sarabura, Ontario (CA); Gregory Warden, Belmont, MA (US)

(73) Assignee: Varolii Corporation, Seattle, WA (US)

( * ) Notice: Subject to any disclaimer, the term of this patent is extended or adjusted under 35 U.S.C. 154(b) by 268 days.

This patent is subject to a terminal disclaimer.

(21) Appl. No.: 10/976,347

(22) Filed: Oct. 28, 2004

(65) Prior Publication Data
US 2005/0198356 A1    Sep. 8, 2005

Related U.S. Application Data

(63) Continuation of application No. 09/621,188, filed on Jul. 21, 2000, now Pat. No. 6,842,772.

(60) Provisional application No. 60/189,145, filed on Mar. 14, 2000.

(51) Int. Cl.
G06F 15/16 (2006.01)

(52) U.S. Cl. .......................... 709/206; 379/67; 379/70; 379/76; 379/79; 379/80; 379/84; 379/88; 455/412; 455/413; 455/414

(58) Field of Classification Search ............. 379/67, 379/70, 76, 79, 80, 84, 88; 455/412–415; 709/206, 238
See application file for complete search history.

(56) References Cited

U.S. PATENT DOCUMENTS

| | | | | |
|---|---|---|---|---|
| 5,714,535 | A * | 2/1998 | Ball et al. | 524/399 |
| 5,848,415 | A * | 12/1998 | Guck | 707/10 |
| 5,926,636 | A * | 7/1999 | Lam et al. | 719/313 |
| 6,199,054 | B1 * | 3/2001 | Khan et al. | 705/400 |
| 6,341,290 | B1 * | 1/2002 | Lombardo et al. | 707/104.1 |
| 6,463,462 | B1 * | 10/2002 | Smith et al. | 709/206 |
| 6,496,693 | B1 * | 12/2002 | Tran | 455/426.1 |
| 6,999,565 | B1 * | 2/2006 | Delaney et al. | 379/88.13 |

* cited by examiner

*Primary Examiner*—Saleh Najjar
*Assistant Examiner*—Liang-che Alex Wang
(74) *Attorney, Agent, or Firm*—Miele Law Group PC

(57) ABSTRACT

Transmission of messages composed on one or more input devices to a single or multiple recipients by means of one or plural communication modes is facilitated. Such communication modes may include conventional or wireless telephone, facsimile transmission, pager, e-mail, postal mail or courier. An application program interface (API) mediates between remote applications requesting messaging functions and a message server that actually implements these functions. The API is capable of processing high-volume requests for message routing, status information, and various other functions on an automated basis, enabling businesses to make routine use of these functions.

10 Claims, 2 Drawing Sheets

APPLICATION PROGRAM INTERFACE FOR MESSAGE ROUTING AND MANAGEMENT SYSTEM

RELATED APPLICATION

This application is a continuation of U.S. application Ser. No. 09/621,188, filed Jul. 21, 2000 (issued as U.S. Pat. No. 6,842,772) which claims priority to U.S. Provisional Application Ser. No. 60/189,145 filed Mar. 14, 2000.

FIELD OF THE INVENTION

The present invention relates to communication services, and in particular to delivery of messages to selected recipients through one or more specified communication modes.

BACKGROUND OF THE INVENTION

Thanks to improvements in technology and widespread consumer interest, once-exotic forms of communication have become commonplace, and today the average consumer has access to a broad array of communications services. The Internet and wireless telephony, once the preserve of an elite few, now routinely supplement traditional telephone services and are frequently supplied by the same carriers. Even inexpensive home computers now include facsimile capability. Businesses employing mobile employees can furnish them with economical pagers that incorporate advanced features, such as text transmission and Internet access.

The sheer proliferation of communication options, while greatly improving access and convenience, has engendered problems as well. The existence of a communication channel does not ensure that the recipient of a message will be "listening" to that particular channel at a given time, yet the sender of a message has no way to know this. Indeed, more channels of communication traffic mean more demands on the attentions of potential recipients, who, feeling besieged by the assault of e-mail, voice mail, pages, etc., may simply inactivate some communication devices at different times. Message senders, therefore, are faced with the choice of risking non-delivery of their messages, or painstakingly re-transmitting a message on every possible mode of communication modality.

It may also be difficult to transmit the same message to multiple recipients. While a single e-mail message, sent once, can reach an unlimited number of destinations, phone messages must be repeated for each call. Moreover, different recipients may have access to different types of communication channels; perhaps some recipients can be reached efficiently only by e-mail, others by fax, and still others by page.

The integration of communication input devices also raises the prospect of messages having multiple forms of content. Today, a single message may include input from a variety of sources (e.g., voice and text); transmitting such a message by traditional means may be quite cumbersome, involving multiple separate transmissions that must be coordinated or difficult "packaging" of the different inputs into a single message.

U.S. Ser. No. 09/496,170, filed on Feb. 1, 2000 and entitled Multi-Mode Message Routing and Management (the entire disclosure of which is hereby incorporated by reference) addresses these difficulties and discloses, inter alia, a facility for transmission of messages composed on one or more input devices to a single or multiple recipients by means of one or plural communication modalities. Such communication modalities may include, for example, conventional or wireless telephone, facsimile transmission, pager, e-mail, postal mail or courier. Thus, a message may be directed to a single recipient via multiple modalities, such as e-mail and fax, in order to ensure the earliest possible receipt of the message; or may be directed to multiple recipients by a single modality or by different modalities (e.g., some recipients receive the message by e-mail, others by fax, others by phone). The facility may be configured to respond to defined "escalation" rules that specify conditions under which different delivery modalities may be sequentially employed. For example, the rules may specify that if there is no response to an e-mailed question within an hour, the recipient is to be telephoned. Moreover, in addition to alternative transmission modalities, the escalation rules may specify alternative recipients (as well as alternative modalities for those recipients). The escalation rules may also specify default contact methods, which may apply to specific individuals or to lists of recipients.

The invention disclosed in the '170 application may include functionality for determining whether a message has been received (e.g., telephone and e-mail polling), as well as automatic sender notification upon confirmation of receipt. Moreover, in addition to monitoring messages in order to confirm their receipt, the invention may facilitate recipients' responses. In this way, the invention can orchestrate multi-question surveys utilizing multiple communication modes; for example, individuals contacted directly can respond immediately, while others can respond later in accordance with instructions delivered to them—e.g., via a web site or by calling a toll-free number.

The invention disclosed in the '170 application supports messages having embedded questions that call for response by the recipient. Such responses, when received, may be communicated to the message sender and/or accumulated.

Also facilitated by the invention disclosed in the '170 is scheduling of message delivery, on a mode-by-mode basis where appropriate. Scheduling may include delivery at a particular time or within a designated time window, or may involve preventing delivery during specified "black-out" periods. In some embodiments, scheduling may be automatic and based on considerations such as the recipient's time zone and the form of communication (e.g., to avoid awakening the recipient by telephone).

However, the '170 application contemplates a system in which customers' client computers communicate via the World Wide Web (the "web") with a server implementing the foregoing functions. In other words, the interaction is essentially manual and stepwise in nature, with customers selecting options and indicating preferences in an interactive session. This model is generally unsuited to business applications requiring more automated, high-volume access to messaging functions.

DESCRIPTION OF THE INVENTION

Brief Summary of the Invention

The present invention provides an application program interface (API) facilitating interaction, generally (although not necessarily) via the Internet, with a message-handling facility such as that disclosed in the '170 application. In accordance with the invention, application programmers utilize a markup language (preferably XML-derived) to configure applications for compatibility and communication with the message-handling facility. The API is capable of processing high-volume requests for message routing, status information, and various other functions on an automated basis, enabling businesses to make routine use of these functions.

Indeed, the range of business-to-business and business-to-consumer organizations that can benefit from flexible messaging services is virtually limitless. For example, an airline may obtain contact information from passengers when tickets are purchased. Should a flight be delayed or cancelled, the airline can generate a single notification for transmission to all passengers via the messaging facility; as the flight time approaches, efforts to reach passengers not yet contacted can be intensified according to defined escalation rules. Similarly, a club or other organization can send out notices of meetings, receive confirmations and preferences from members, and alert them to changes using the messaging facility by means of the API. The message need be written and transmitted by the organization only once; all remaining operations, from bulk retransmission to collecting and organizing responses, are performed automatically.

In accordance with the invention, a message server comprising a plurality of modalities for transmitting messages is associated with an API. An application, typically implemented on a remote server, is configured to receive a message and a designation of one or more transmission modalities, and is further adapted for interaction with the API. The API comprises stored instructions supporting the interaction. Upon receiving the message and the designation from the application server, the API causes the message server to transmit the message according to the designation.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE PREFERRED EMBODIMENTS

1. Technical Context

Figure 1:
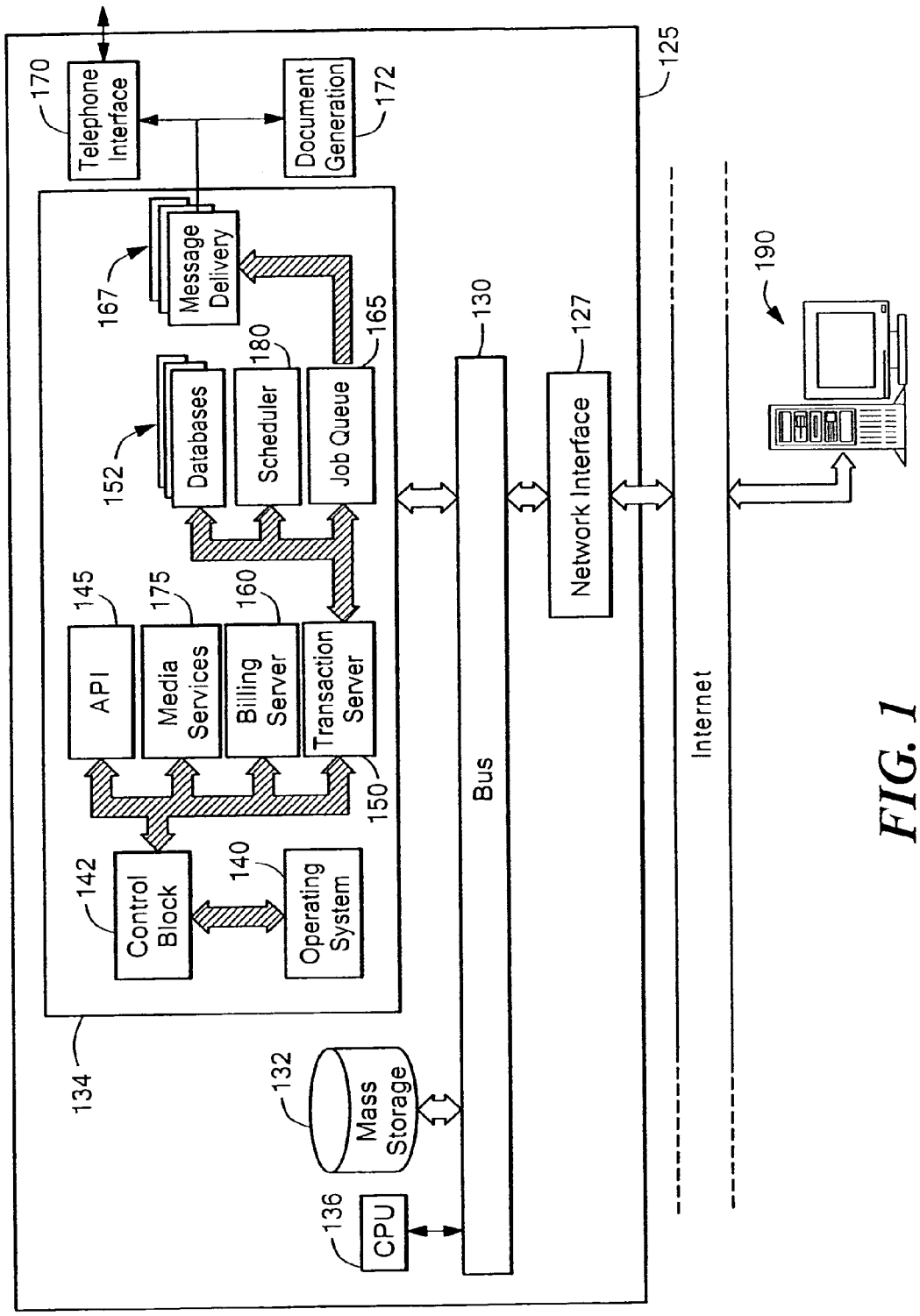
FIG. 1 schematically represents the environment of the invention.

The functions of the messaging system are implemented by a server 125, which may be realized as a single workstation or as a network of server computers, depending on the activity level and included functionality. For explanatory purposes, server 125 is represented as a single machine that includes a network interface 127 continuously connected to the Internet. Network interface 127 and the other internal components of server 125 intercommunicate over a main bidirectional bus 130 (which may be a physical bus in a single hardware device, or can instead represent a network such as a LAN or a WAN). The main sequence of instructions effectuating the functions of server 125 and facilitating interaction among customers, server 125, the Internet, and other modes of communication reside on a mass storage device (such as a hard disk or optical storage unit) 132 as well as in a main system memory 134 during operation. Execution of these instructions and effectuation of the functions of server 125 is accomplished by a central-processing unit ("CPU") 136.

A group of functional modules that control the operation of CPU 136 and perform the operations of server 125 is shown conceptually as located in system memory 134; once again, however, it should be stressed that this organization is for explanatory purposes. The various modules and servers may indeed be implemented as active processes running on a single machine, but functionality may instead be distributed among multiple machines (or processors within a single machine), once again depending on the activity level and included capabilities.

An operating system 140 directs the execution of low-level, basic system functions such as memory allocation, file management, and operation of mass storage devices 132. At a higher level, a control block 142, implemented as a series of stored instructions, manages interaction among the various functional components of the server and ensures proper routing of data thereamong.

Although server 125 may be capable of communicating directly with customers by means of the web and electronic mail, as explained in the '170 application, the present application is concerned primarily with hardware-to-hardware communications. Accordingly, an API 145 receives and processes communications from external sources, and transmits proper responses to those sources, via network interface 127. API 145 represents a programmatic interface for direct connection to appropriately configured third-party applications. The pattern of interaction with the external source, including the content of transmissions thereto, is handled by a transaction server 150. Transaction server 150 has access to various databases, collectively indicated at 152; these databases, discussed in greater detail below, are ordinarily stored on devices 132 and accessed as necessary. Depending on the requests received by API 145, transaction server 150 causes messages to be assembled and transmitted to designated contacts, and retrieves and assembles information for transmission to outside inquiries. Credit-card validation and billing for services are handled by a billing server 160.

The various functions performed by server 125, which result in different patterns of interaction with customers, will now be described.

1.1 Media Conversion and Basic Message Transmission

A series of media servers, collectively indicated at 175, represent the interface servers that format messages for transmission; these messages may be in the form of voice, text (for transmission by e-mail, web or postal mail), or other desired format. Messages and media designations are received from remote applications via API 145, and once transaction server 150 has received sufficient commands and content to fully specify a message (i.e., the message body, the recipient(s), desired delivery methods, and message options such as delivery scheduling and/or escalation rules), a message "job" is created and stored in a database 152. The job is passed to a job queue server 165, which is responsible for implementing and scheduling all message jobs.

At this point, the message remains in the format in which it was generated. As noted previously, however, server 125 is capable of receiving messages, via the interface servers, in one format and transmitting them in a different, customer-selected format. The functions of media conversion and message assembly are performed by a series of message delivery servers, collectively illustrated at 167, dedicated thereto. The appropriate message delivery server 167 converts messages to the specified format and causes their transmission, via the designated communication medium, by means of a corresponding device driver selected from among a suite of drivers. The drivers operate a series of transmission devices, which include network interface 127 for e-mail and/or web-based message delivery; a telephone interface 170 for message transmission by telephone, facsimile, pager, or handheld wireless device (although it should be noted that pager and wireless transmission can occur through network interface 127); and a document-generation module 172 for message transmission by postal mail or overnight courier.

The timing of message transmission is governed by job queue server 165. In response to the customer's authorization to send a message, job queue server 165 triggers the conversion and transmission operations just discussed. Job queue server 165 also contains (or, as shown for illustrative purposes, communicates with) a scheduling module 180, which can orchestrate transmission of messages at customer-specified times based on the computer's internal clock.

Server block 165 may contain a text-to-speech conversion module, enabling customer-provided text to be transmitted by voice to the recipient by means of telephone interface 170. Conversely, telephony server 175 may be configured to respond to spoken customer commands, allowing the customer to compose and address a message by telephone (i.e., by communicating with server 125 by means of telephone interface 170).

In still more complex operational modes, server 125 may facilitate catenation of message—either as separate segments of the same format, or as segments encoded in different formats. In the case of audio messages, for example, a message delivery server 167 may append an audio "header" (typically a so-called "professional prompt") and a "trailer" to the customer's message. Thus, when the recipient answers the telephone, the header portion of the message may tell him that he is about to receive a message from the customer, and the trailer portion may facilitate response (as explained in further detail below).

1.2 Confirming Message Receipt

Any of a variety of techniques can be used to assess whether and when a message is received. Many e-mail systems natively support receipt confirmation. Alternatively, a URL can be embedded in the message; when the recipient receives the e-mail and clicks on this URL, receipt is automatically recorded. Moreover, the URL-specified web page may contain questions inviting response by the recipient, who thereupon transmits the web page back to server 125.

Hard-copy deliveries can be tracked through the courier or by means of a follow-up telephone call to the recipient, while for telephone messages, the recipient can be asked to press a number to confirm receipt. In the context of telephone messages, it may be useful to detect whether a person or an answering machine has answered the phone. This determination can be used, for example, to select a proper audio header or even to choose between alternative messages, which may differ depending whether the message is delivered to the recipient or a recording device; an answering machine, obviously, would not be asked to press a number to confirm receipt, nor would delivery typically be confirmed to the sender if the message was left on an answering machine. To implement answer detection, telephony server 147 is programmed to monitor the level of noise on the line once a connection is established, distinguishing between a "silence" noise level and a "speech" level. If an individual answers, he or she will typically issue a short greeting; that is, the signal pattern of a human answer is a short speech signal followed by silence. An answering machine, by contrast, will generally issue a long greeting ("Hello, you have reached the Smiths . . . "). Based on the observed lengths of a sustained speech signal and an ensuing silence, telephony server 147 forms an initial guess as to whether a person or a machine has answered. If a person is guessed, telephony server 147 will play the audio header that prompts the answerer to press a touch-tone key, and if the proper touch-tone pulse is not detected, server 147 may revise its guess and assume that it is communicating with an answering machine.

1.3 Message Scheduling

It may not be appropriate to transmit messages by certain modes during particular time periods at the recipient's location. These "blackout" time periods may be established automatically by server 125, or may be designated by the customer or the recipient. Via API 145, an external application may indicate blackout time periods for a particular message, or may permanently designate such periods for particular contacts (and particular communication modalities). Most commonly, permanently designated blackout periods are used to prevent messages from being sent by telephone or pager during times when the recipient is generally likely to be asleep or away from the communication modality. Message-specific blackout periods may be utilized by message senders familiar with the recipient's immediate schedule, or who do not wish to permanently establish blackout periods.

Conversely, the external source may specify particular allowed time windows within which a message must be delivered. Once again, these may be established permanently for particular contacts or "on the fly" for specific messages.

Time-zone scheduling may be employed automatically. For example, if the customer authorizes immediate message delivery at a time that would be late at night where the recipient is located, or schedules message delivery for such a time, transaction server 150 may cause the customer to be prompted with this information and asked to confirm or reschedule delivery.

1.4 Escalation

Rather than send a message to a prospective recipient redundantly via multiple communication modalities, transaction server 150 may be configured to allow the specification of escalation rules for sequential transmission as necessary. The external application selects a plurality of communication modalities and/or contacts, and criteria in the form of rules governing their use. Typically, an escalation rule will specify resort to a different communication modality (or a different recipient) if delivery of the message is not confirmed by a specified time, or within a specified period, using the current communication modality.

Like scheduling restrictions, escalation rules may be defined permanently for a contact (and stored, along with "address book" information pertaining to that contact, in database 152b) or may instead be defined for a particular message. Default message modalities and permanent escalation rules are particularly useful in the context of distribution lists, since the external application can simply enter a message and leave it to server 125 to deliver it to every person on a selected distribution list in accordance with each contact's escalation rules. On the other hand, message-specific escalation rules may be designated for particular messages transmitted to API 145.

To implement the escalation rules, the time period specified in a rule relevant to the initial message transmission is sent to scheduler 180. At the end of that time period following transmission, transaction server 150 determines whether the message has been received in the manner described above. If not, the escalation rule (defined in database 152*b* or in the transaction record for the particular message) is executed, and the message re-transmitted by a different modality. If further escalation rules remain for the message, the appropriate time period is once again provided to scheduler 180, and the flow sequence repeated.

2. An Exemplary Application Program Interface

Figure 2:
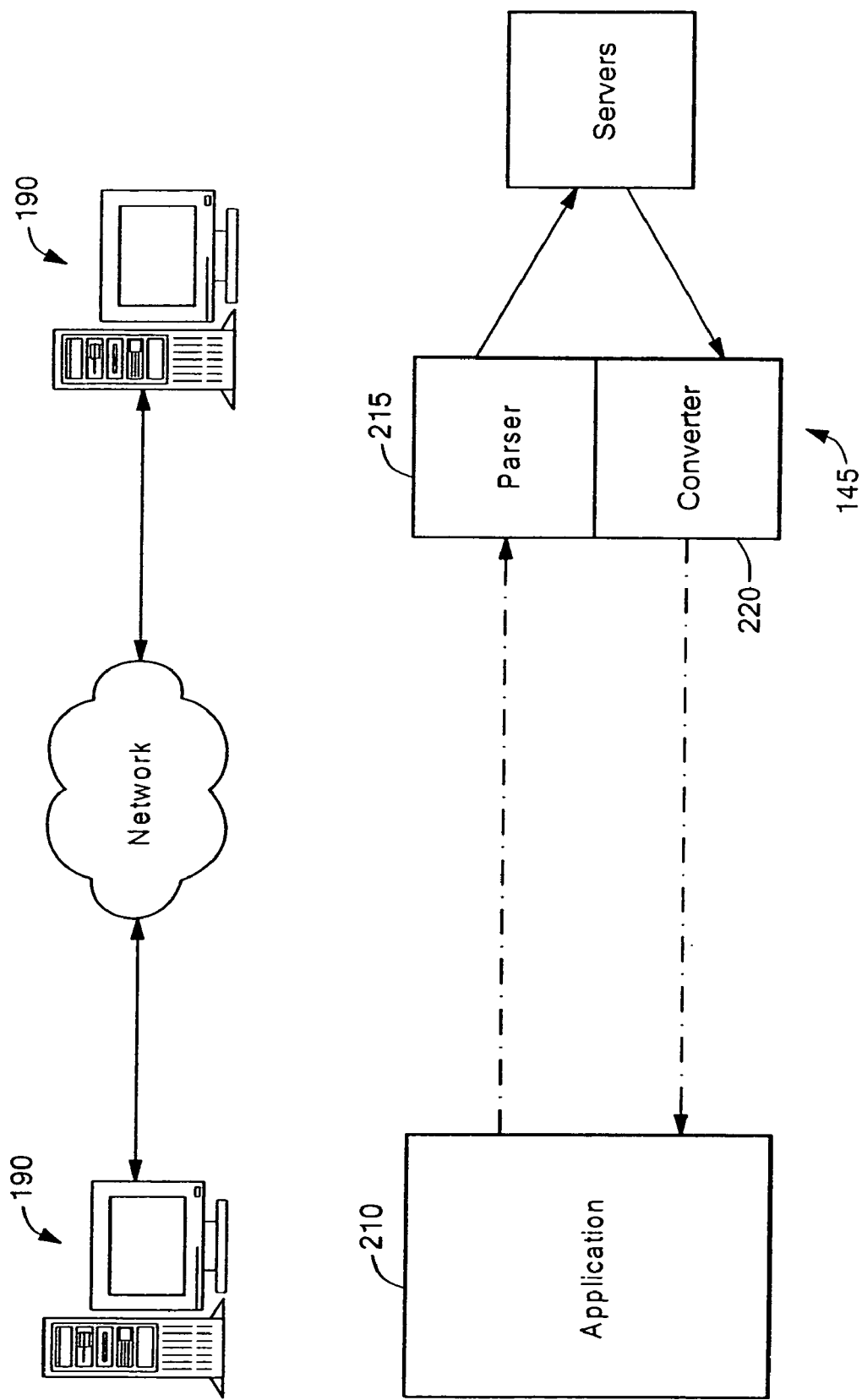
FIG. 2 schematically illustrates the components of the API and its mode of interaction.

With reference to FIGS. 1 and 2, external sources such as a server 190 generate requests for messaging functions and status information, and transmit these to server 125 via a computer network, such as the Internet, for processing. FIG. 2 illustrates in greater detail the role and basic components of API 145. Requests are actually generated by an application 210 running as an active process on server 190. Application 210 formats these requests in the syntax allowed by API 145. Requests received by API 145 from application 210 are analyzed by a parser 210, which interprets the request and causes the various server modules of server 125 to take appropriate action. The server modules may generate direct responses to the requests or provide status information for transmission to application 210. A converter 220 places such information into statements conforming to the API syntax prior to transmission.

Preferably, the API syntax conforms to the conventions of XML, using "tags" to characterize elements such as statements and field data. A tag surrounds the relevant element(s), beginning with a string of the form <tagname> and ending with </tagname>. Thus, parser 215 can be (or be based on) a conventional XML parser.

The contents of a communication to or from API 145 take the form of a "document," which contains an identifying tag and either a "Request" (for documents generated by application 210) or a "Response" (for documents that API 145 returns to applications 210). Document elements are hierarchically organized into objects. Each object specifies the contents of fields associated with the object, and may also contain one or more nested, hierarchically inferior objects; this structure maintains the organization of information, facilitates movement of information in meaningful packages, and allows for re-use of information without explicit repetition.

At the highest hierarchical level, "Super Objects" define the communication as a Request or a Response, and contain one or more "Major Objects." The Major Objects specify key functional elements of messaging activities, defining the relevant user accounts and the nature of the desired message functions, and may contain sub-objects and/or entries for various fields within the Major Objects. Fields contain information, such as character strings or numbers, relevant to the objects containing them.

The overall organization of a preferred implementation of API 145 appears in summary form below; following the summary, the various objects and fields are described in greater detail. It should be understood that this API is illustrative only.

TABLE 1

Basic API Organization

I. Super Objects: contain required fields and one or more major objects
  A. Request (fields:)
    i) UserName
    ii) Password
    iii) Domain
    iv) OEMId
    v) OEMPassword
    vi) RequestType
  B. Response: same fields/objects as request + errors, warnings
II. Major Objects: required elements of documents, may contain subobjects and fields
  A. Member (fields:)
    i) Command
    ii) Id
    iii) FirstName
    iv) LastName
    v) Company
    vi) UserName
    vii) Password
    viii) AllowNotices
    ix) DialinId
    x) Dialin Password
  Member (subobjects:)
    i) Contact Method
    ii) Billing (fields: Id; Billing Plan; CurrentBalance)
    iii) Credit Card (fields you'd expect)
  B. Contact (subobjects:)
    i) Contact Method (fields:)
      a. Id
      b. Transport
      c. Qualifier
      d. Ordinal
      e. PhoneNum, FaxNum, PagerNum
      f. Access Code
      g. Email Address
      h. Street1
      i. Street2
      j. Suite
      k. City
      l. State
      m. Zip
      n. Country
    ii) Contact MethodRef (fields:)
      a. Id
      b. FirstName, LastName, Company
      c. Transport, Qualifier, Ordinal
      d. AllowMultiple
  Contact (fields:)
    i) Command
    ii) Id
    iii) Prefix (optional)
    iv) First Name, Middle Name, Last Name
    v) Company (optional)
    vi) Title (optional)
  C. Distribution List (fields:)
    i. Command (create, replace, append, delete, remove)
    ii. Name
    iii. Description
    iv. Id
  D. Job (fields:)
    i. Id
    ii. Charges
  Job (subobjects:)
    i. Message (fields:)
      A. Subject
      B. Template (optional)
      C. Id
      D. Date
    Message (subobjects:)
      A. MessageArg Objects: series of Name/Value tags:
        1) SENDER
        2) BODY
        3) ASK_YESNO_QUESTION
        4) QUESTION_TO_ASK
        5) EMAIL_ADDR TABLE 1-continued Basic API Organization B. DeliveryTime Objects
  C. DeliveryTimeModifier Objects
 ii. Contact (to specify one-time recipient of message)
 iii. Delivery Request (elements:)
  A. DeliveryOptions field (in)
  B. Contact MethodRef sub-object
 Delivery Request (returned elements:)
  A. ContactMethod
  B. Contact
  C. Delivery (fields:)
   1) Id
   2) Timestamp
   3) Duration
   4) Status (Not Sent, Sent, Failed, Cancelled, Cancel Pending)
   5) Details (Bad Address, Delivery Address is unreachable, No Answer, Busy, Answering Machine (assumed), Answering Machine, Maximum Delivery Attempts Exceeded, Acknowledged, Modem, Hangup, Callback Later, Internal Error
   6) Size
   7) Cost
  D. DeliveryRequest fields (out)
   1) Id
   2) EstDuration
   3) EstSize
   4) Status
   5) Details
   6) Completed
 E. Range (fields:)
  i. Object (i.e., type of object trying to look up)
  ii. Type
  iii. Start
  iv. End Every transmission to API 145 requires a Request, which will generate a Response from API 145 (and the server modules with which it functions). The Request must identify one or more valid "Members" by means of UserNames. A request contains the following required fields:

(In this and other tables, the In/Out column indicates whether the field is used in a Request (in), in a corresponding Response (out), or in both.)

In addition to fields, the Request will generally contain one or more Major Objects. Typical actions include: send message to specified recipients; add/edit/delete member, distribution list, contact information; look up the status of a job; send a billing inquiry. The following represents a typical Request (with the Contact Object, discussed in greater detail below, indicated but not actually specified):

```
<Request>
    <UserName>RalphW</UserName>
    <Password>abc123</Password>
    <Domain>POETS</Domain>
    <OEMId>OEMId</OEMId>
    <OEMPassword>OEMPassword</OEMPassword>
    <RequestType>validate</RequestType>
    [Contact Object]
</Request>
```

The Response is generally returned with the same objects that were included in the Request; if, however, the Request asks for information (e.g., a request for message status or for billing information), some objects or fields may be added or changed. In addition, the Response will contain Errors and Warnings fields as appropriate:

TABLE 2

Request Fields

| Field | Description | In/Out | Allowed Values | Example |
|---|---|---|---|---|
| UserName | Login name that identifies the member | In | String | <UserName>Ralphw</UserName> |
| Password | Password for the member, assigned by the domain | In | String | <Password>abc123</Password> |
| Domain | Identifier (generally identifies the company or organization to which the member belongs) | In | String | <Domain>POETS</Domain> |
| OEMId | The domain ID (identifies company or organization) | In | | <OEMId>kkk52057kk</OEMId> |
| OEMPassword | The client password | In | | <OEMPassword>OEMpassword</OEMPassword> |
| Request type | Request one of the following actions: Validate (Check all of the fields and sub-objects for syntax and validation errors; does not take any additional action) Commit (Put the document in database, and initiate requested actions) Look up (Find objects in the database, based on specified criteria, used with the Range object only) | In | validate commit lookup | <RequestType>validate</RequestType> |

TABLE 3

Errors and Warnings (Response Fields)

| Fields | Description | In/Out | Allowed Values | Example |
|---|---|---|---|---|
| Errors | Set to the number of errors discovered while processing the major objects included in the Request | Out | Unsigned integer | <Errors>2</Errors> |
| Warnings | Set to the number of warnings (a less severe error) discovered while processing the major objects included in the Request | Out | Unsigned integer | <Warnings>0</warnings> |

Errors and Warnings are described in greater detail below.

The following represents a typical Response (with the Contact Object once again indicated but not actually specified):

```
<Response>
    <UserName>Ralphw</UserName>
    <Password>abc123</Password>
    <Domain>Poets, Inc.</Domain>
    <OEMId> OEMId<OEMId>
    <OEMPassword> OEMPassword</OEMPassword>
    <ResponseType>validate</ResponseType>
    <Errors>2</Errors>
    <Warnings>0</Warnings>
[Contact Object]
</Response>
```

Requests and Responses specify one or more Major Objects as follows:

TABLE 4

Major Objects

| Major Object | Description |
|---|---|
| Member | User-level login that identifies a user account (end user or member) |
| Contact | Person or organization to which a message may be sent |
| Distribution List | A group of contact methods (for example, phone number, pager number, email address) to which a message may be sent |
| Job | Message to one or more contacts using one or more contact methods |
| Range | Used to look up other objects based on specific search criteria; for example, to look up a job by Id, or jobs sent on a certain date, or all contacts from the same organization |

Each Major Object contains zero or more fields and sub-objects, which may themselves contain additional sub-objects and/or fields. The various Major Objects will now be described in detail.

Major Objects—Member: generally an end user of the messaging service.

Major Objects—Member—Fields: The Member object has the following fields:

TABLE 5

Member Major Object Fields

| Field | Description | In/Out | Allowed Value | Example |
|---|---|---|---|---|
| Command (Required) | Requests one of the following actions: Create (Add a new Member object) Update (Modify Member object information) Remove (Remove a Member object) | In | create update remove | <Command>create</Command> |
| Id | Unique identifier assigned in a Response to a Request to create a Member object | Create (Out) Update (In) Remove (In) | Alphanumeric string | <Id>k5j34kd</Id> |
| FirstName (Required) | The member's first name | In | String with a 32-character limit | <FirstName>Virginia</FirstName> |

TABLE 5-continued

Member Major Object Fields

| Field | Description | In/Out | Allowed Value | Example |
|---|---|---|---|---|
| LastName (Required) | The member's last name | In | String with a 32-character limit | <LastName>Woolf</LastName> |
| Company (Optional) | The member's company affiliation | In | String with a 32-character limit | <Company>Hogarth Press</Company> |
| UserName | The member's login; must be unique within the domain | In | String with a 32-character limit | <UserName>VirginiaW</UserName> |
| Password | The member's secret password | In | String with a 32-character limit | <Password>abc123</Password> |
| AllowNotices | Marks this member as being interested in receiving receive periodic mailings specific to this domain | In | "True" (to allow) otherwise, "False" | <AllowNotices>true</AllowNotices> |
| DialinId | This is a way for the member to identify himself when calling into a voice response (automated touch tone telephone) system. | In | Numeric string | <DialinId>9146445543</DialinId> |
| DialinPassword | Serves as a PIN for the voice response system | In | Numeric string | <DialinPassword>1234</DialinPassword> |

Major Objects—Member—Sub-objects: In addition, the Member object contains the following required sub-objects:

Major Objects—Member—Sub-objects—Contact Method: specifies communication mode (e-mail, telephone, etc.) and contact information (e-mail address, telephone number, etc.) specific thereto. Contact Method sub-objects are further described below in connection with the Contact Major Object.

Major Objects—Member—Sub-objects—Billing: specifies the billing plan and details necessary to bill the member (such as a credit-card number). The object also describes the current account status. The following table sets for the required fields for the billing sub-object:

TABLE 6

Member Major Object Billing Sub-object

| Fields | Description | In/Out | Allowed Values | Example |
|---|---|---|---|---|
| Id | Unique identifier | Out | | <Id>k123lbj4</Id> |
| Billing Plan | Indicates which plan the member is using (pay-as-you-go, prepaid, both using a credit card) | In | | <BillingPlan>kkk33kkkk</BillingPlan> |
| CurrentBalance | Current balance in US dollars as a floating point number | Out | | <currentBalance>15.22</CurrentBalance> |

The billing sub-object, in turn, contains a Credit Card sub-object, the fields for which are set forth in the following table:

TABLE 7

Member Major Object
Billing Sub-object
Credit Card Sub-object

| Fields | Description | In/Out | Allowed Values | Example |
|---|---|---|---|---|
| FirstName, MiddleName, LastName | Name as it appears on the credit card | In | Each name field is a string with a 32-character limit | <FirstName>Virginia</FirstName> <MiddleName>L.</MiddleName> <LastName>Woolf</LastName> |
| CreditCard Number | Required | In | Number as it appears on the credit card | <CreditCardNumber>5123123412341233</CreditCardNumber> |
| Expiration Month | Expiration month as it appears on the credit card | In | Two-digit number as it appears on the card | <ExpirationMonth>8</ExpirationMonth> |
| ExpirationYear | Expiration year as it appears on the credit card | In | Four-digit number | <ExpirationYear>2001</ExpirationYear> |
| StreetAddress1 | First line of the street address for this card | In | First line of billing address for this card | <StreetAddress1>25 Hollywood st.</StreetAddress1> |
| StreetAddress2 | Second line of the street address for this card | In | Second line of billing address for this card | <StreetAddress2>Hogarth Press Inc.</StreetAddress2> |
| City | City of billing address for this card | In | City Name | <City>Los Angeles</City> |
| State | State of billing address for this card | In | Use two-letter state abbreviation | <State>CA</State> |
| Zip | Zip code in the US postal code outside | In | Zip codes can be either five or nine digits; hyphen is optional | <Zip>90210-1234</Zip> |
| Country | Country | In | Country name | <Country>USA</Country> |

The following is an example of entire Member Object:

```
<Member>
    <Command>create</Command>
    <FirstName>Ralph</FirstName>
    <LastName>Emerson</LastName>
    <Company>Poets R Us</Company>
    <UserName>RWE</UserName>
    <Password>MyPassword</Password>
    <DialinId>12345</DialinId>
    <DialinPassword>12345</DialinPassword>
    <ContactMethod>
        <Transport>email</Transport>
        <Qualifier>none</Qualifier>
        <EmailAddress>ralph@Poets.com</EmailAddress>
    </ContactMethod>
    <ContactMethod>
        <Transport>phone</Transport>
        <Qualifier>office</Qualifier>
        <Ordinal>0<Ordinal/Ordinal>
        <PhoneNum>617-123-4567</PhoneNum>
    </ContactMethod>
    <Billing>
        <BillingPlan>kkk33kkkk<BillingPlan>
        <CurrentBalance>1.00<CurrentBalance>
        <CreditCard>
            <FirstName>Ralph</FirstName>
            <MiddleName>Waldo</MiddleName>
            <LastName>Emerson</LastName>
            <CreditCardType>Master
            Card</CreditCardType>
            <CreditCardNumber>5123123412341233</CreditCardNumber>
            <ExpirationYear>2001</ExpirationYear>
            <ExpirationMonth>8</ExpirationMonth>
            <StreetAddress1>1313 Mockingbird Lane</StreetAddress1>
            <StreetAddress2>Poets R Us</StreetAddress2>
            <City>Warren</City>
            <State>MA</State>
            <Zip>01810</Zip>
            <Country>USA</Country>
        </CreditCard>
    </Billing>
</Member>
```

Major Objects—Contact: identifies an individual to whom a message may be sent. A Contact Object contains one or more Contact Method sub-objects (described below), each of which identifies a way to reach the individual. Contact and Contact Method information may or may not be stored in a member's Address Book (i.e., the a collection of a member's Contacts and their associated Contact Methods stored in database 152*b*). Thus, a Contact Major Object may be created to be stored in an Address Book, or for one-time use.

Major Objects—Contact—Fields: The Contact object has the following fields:

TABLE 8

Contact Major Object Fields

| Fields | Description | In/Out | Allowed Values | Example |
|---|---|---|---|---|
| Command | Requests one of the following actions: Create(Add a new Contact object) Update(Modify Contact object information) Remove(Remove a Contact object) | In | create update remove NOTE: (This field is required only when the Contact is to be used as a major object that is, so the contact is stored in the Address Book for reuse.) | <Command>create</Command> |
| Id | Required field that identifies the member when the Command field is used to update, or remove the Contact. | In (for update and remove) | Supplied after a contact has been created. | <Id>k5j34kd</Id> |
| Prefix (Optional) | Indicates the contact's preferred title; for example; Mr., Ms, Dr. | In | String | <Prefix>Mr.</Prefix> |
| First Name Middle Name Last Name | The contact's first, middle and last names; first and last names are required | In | Each name field is a String with a 32-character limit | <FirstNamex>Willam </FirstName> <MiddleName>S. </MiddleName> <LastName>Shakespeare </LastName> |
| Company (Optional) | Indicates the name of the company or organization with which the contact is affiliated | In | String with a 32-character limit | <Company>Globe Theater, Inc.</Company> |
| Title (Optional) | Indicates a job title for the contact | In | String with a 32-character limit | <Title>Director</Title> |

Use of the Command field ensures that the Contact Object will be stored in the Address Book of the member with which it is associated. When the Contact Object is nested as a sub-object of a Job object (described below), the contact information will not be stored in an Address Book.

The following represents a typical Contact Object (with Contact Method objects indicated but not actually specified):

```
<Contact>
    <prefix>Mr.</Prefix>
    <FirstName>William</FirstName>
    <MiddleName>L.</MiddleName>
```

-continued

```
    <LastName>Shakespeare</LastName>
    <Company>Globe Theater, Inc.</Company>
    <Title>Director</Title>
    [ContactMethod Objects]
</Contact>
```

Major Objects—Contact—Sub-objects—Contact Method: as explained above, this object specifies the manner in which a member may be contacted. A Contact Method sub-object may contain some or all of the following fields:

TABLE 9

Contact Method Sub-object Fields

| Field | Description | In/Out | Allowed Values | Example |
|---|---|---|---|---|
| Id | Identifies this Contact Method object | In or Out | Required based on the logic for the parent Contact object NOTE: The Contact Method object does not have a Command field; rather, it is nested within a Contact object that does have a Command field. | <Id>k5j34kd</Id> |
| Transport (Required) | Indicates delivery method | In | Phone Fax Pager Email Mail | <Transport>email</Transport> |

TABLE 9-continued

Contact Method Sub-object Fields

| Field | Description | In/Out | Allowed Values | Example |
|---|---|---|---|---|
| Qualifier (Required) | Indicates the type of phone or fax | In | Home<br>Home2<br>Office<br>Office2<br>Cell<br>NOTE: Member is a legal value for Qualifier only when used in a Member object. | <Qualifier>cell</Qualifier> |
| Ordinal | A counter that allows entry of more than one exact type of contact method. | In | Unsigned integer; Only required if there is more than one of a particular kind of contact method (home 0, home1). For example, for your first phone number, the ordinal would be "0"; for the second, the ordinal would be "1" | <Ordinal>0</Ordinal> |
| PhoneNum FaxNum PagerNum | Telephone number for phone, fax, pager | In | Typical phone number with area code (no "1" for long distance needed); for example 2121234567; hyphen is optional | <PhoneNum>212-123-4567</PhoneNum><br><FaxNum>2121234568</FaxNum><br><PagerNum>800-456-4567</PagerNum> |
| Access Code | Access number for a pager | In | Used only when the pager service requires the caller to enter an identifying touch tone string (sometimes, ending with the pound sign or asterisk) before entering a callback number. | <AccessCode>77325#</AccessCode> |
| Email Address | Email address | In | Typical email address | <EmailAddress>1<[CDATA[jkrowling@bloomsbury.com]]></EmailAddress> |
| Street1 | Street address | In | String with 32 character limit | <Street1>100 park Avenue</Street1> |
| Street2 | Second line of address | In | String with 32 character limit | <Street2>Waldorf Astoria Hotel</Street2> |
| Suite | Suite number, if applicable | In | String with 32 character limit | <Suite>Tower Suite 1400</Suite> |
| City | City | In | String with 32 character limit | <City>New York</City> |
| State | State | In | Two-character abbreviation | <State>NY</State> |
| Zip | Zip code in the US; postal code elsewhere | In | String | <Zip>10021</Zip> |
| Country | Country | In | String with 32 character limit | <Country>USA</Country> |

To denote a member's primary e-mail address, for example, the following syntax is employed:

```
<Contact Method>
    <transport>email</transport>
    <qualifier>member</qualifier>
    <EmailAddress>ralph@poets.com</EmailAddress>
</Contact Method>
```

The following example illustrates addition of a new contact to an Address Book:

```
<Contact>
    <Command>create</Command>
    <FirstName>Albus</FirstName>
    <LastName>Dumbledore</LastName>
    <Company>Hogwarts School for Witchcraft and
    <Wizardry</Company>
    <Title>Headmaster</Title>
    <ContactMethod>
        <Transport>phone</Transport>
        <Qualifier>cell</Qualifier>
        <PhoneNum>9785551234</PhoneNum>
    </ContactMethod>
    <ContactMethod>
        <Transport>pager</Transport>
        <PagerNum>8885551234</PagerNum>
        <AccessCode>1030#</AccessCode>
    </ContactMethod>
</Contact>
```

Major Objects—Contact—Sub-objects—Contact MethodRef: once a Contact Method has been created and stored, it may be referred to using a pointer called a Contact MethodRef. The pointer contains the Contact Method's Id, or a combination of fields that will uniquely identify that Contact Method.

A Contact MethodRef sub-object may contain some or all of the following fields:

TABLE 10

Contact MethodRef Sub-object Fields

| Field | Description | In/Out | Allowed Values | Example |
|---|---|---|---|---|
| Id | Identifies this Contact Method object | In | Existing Contact Method Id | <Id>k5734kd</Id> |
| FirstName LastName Company | These fields are all from the Contact object | In | Existing Contact fields | <FirstName>Ron</Firstname> <LastName>Weasley</Lastname> <Company>Hogwarts<Company> |
| Transport Qualifier Ordinal | These field are all from the Contact Method sub-object | In | Existing Contact Method fields | <Transport>email</Transport> <Qualifier>home</Qualifier> <ordinal>0<Ordinal> |
| AllowMultiple | | In | true (default value) false If this field is set to a value of "false", will only return the first Contact Method that meets your criteria. | <AllowMultiple>true </AllowMultiple> |

Major Objects—Distribution List: a Distribution List is a grouping of Contact Methods. It allows a member to send a message to all of the Contact Methods in that list. A Distribution List object may contain some or all of the following fields:

TABLE 11

Distribution List Major Object Fields

| Field | Description | In/Out | Allowed Values | Example |
|---|---|---|---|---|
| Command (Required) | Indicates the desired action. Options include: Create (Create a Distribution List) Replace (Replace existing Contact Methods in this list with the Contact Methods contained in this request) Append (Add Contact Methods to the existing list) Delete (Delete Contact Methods from the list) Remove (Remove the whole Distribution List) | In | Must include one of the following values: create replace append delete remove | <Command>append </Command> |
| Name | Unique name for Distribution List | In | When creating a list, give it a unique name; for example, "Gryffindor" (32 character limit). NOTE: When using any other command option, you must enter either Name or Id field to identify the Distribution List | <Name>Gryffindor</Name> |
| Description | Descriptive text about the list | In | Optional field | <Description>Gryffindor House</Description> |
| Id | Unique identifier for the list | In/Out | If the value of the Command-field is create, no Id field is required, if any other value, enter a value for either Name or Id field | <Id>k431k45</Id> |

In addition, the Distribution List object must have a list of Contact MethodRef sub-objects (i.e., pointers to already-created Contact Method objects). An exemplary Distribution List object is as follows:

```
<Distribution List>
    <Command>append</Command>
    <Name>Gryffindor</Name>
    <ContactMethodRef>
        <LastName>Potter</LastName>
        <Transport>email</Transport>
    </ContactMethodRef>
    <ContactMethodRef>
        <Id>kkk3btkk</Id>
    </ContactMethodRef>
</Distribution List>
```

TABLE 12

Job Major Object Fields

| Fields | Description | In/Out | Allowed Values | Examples |
|---|---|---|---|---|
| Id | Identifier for this Job. | Out | | <Id>kkk3btkk</Id> |
| Charges | Estimated cost of this Job | Out | Floating point number | <Charges>1.60</Charges> |

Major Objects—Job—Sub-objects—Message: the Message sub-object specifies the actual message. It includes fields and optional MessageArg Objects, and allows the requester to specify delivery times.

TABLE 13

Job Major Object
Message Sub-object Fields

| Fields | Description | In/Out | Allowed Values | Example |
|---|---|---|---|---|
| Subject field (Required) | The "Subject" line of the message | In | The actual text of your message | <Subject><![CDATA[Friday's sales meeting is cancelled.]]></Subject> |
| Template (optional) field | | In | | <Template>generic</Template> |
| Id | Unique identifier for this Message sub-object | Out | | <Id>kkk17lbj4</Id> |
| Date | Marks the date and time the message was submitted | Out | | <Date>1999:10:20 19:14:39</Date> |
| DeliveryTime | Marks the requested time of delivery | In | | <DeliveryTime>1999:10:20 19:14:39</DeliveryTime> |
| DeliveryTime Modifier | Options related to the requested delivery time | In | StartingAt or TryToFinishBy | <DeliveryTimeModifier>StartingAt</DeliveryTimeModifier> |

Major Objects—Job: a Job object contains a message to one or more Contacts using one or more Contact Methods, and contains sub-objects that define the specifics of the messaging task (e.g., the sender, the body of the message, recipients, etc.) A Job object also contains at least one Message sub-object (described below), and one or more Delivery Request or Contact sub-objects.

A Job object contains only two fields, and these are specified only in a Response:

Major Objects—Job—Sub-objects—Message—MessageArg Sub-objects: a Message object contains one or more MessageArg sub-objects that consist of a series of Name/Value tags according to the following syntax:

```
<MessageArg>
    <Name>SENDER</Name>
    <Value>Hermione Grainger</Value>
</MessageArg>
```

The optional MessageArg Name/Value tags are as follows:

TABLE 14

Job Major Object
Message Sub-object
MessageArg Sub-object Tags

| Name | Legal Values | Description | Example |
|---|---|---|---|
| SENDER | Character string | The sender's (member) name. It is used in the From field for all methods of transport except email. | <MessageArg><br><Name>SENDER</Name><br><Value>Oliver Wood</Value><br></MessageArg> |
| BODY | Character string | The actual text of the message. This text should be enclosed in CDATA tags. | <MessageArg><br><Name>BODY</Name><br><Value><![CDATA[<br>I have scheduled an extra Quidditch practice session before the match with Slytherin. Be there Wednesday at 8:00AM sharp.]]><br></Value><br></MessageArg> |
| ASK_YESNO_QUESTION | YES NO | If a yes/no question is asked, this should be set to YES, otherwise NO; for example, | <MessageArg><br><Name>ASK_YESNO_QUESTION</Name><br><Value>YES</Value><br></MessageArg> |
| QUESTION_TO_ASK | | If the ASK_YESNO_QUESTION field is set to YES, use this field to enter the actual text of the question. | <MessageArg><br><Name><QUESTION_TO_ASK</Name><br><Value><![CDATA[<br>Can you make the practice session?]]><br></Value><br></MessageArg> |
| EMAIL_ADDR | | The email address that is used in the From and Reply-to fields when sending a message via email. | <MessageArg><br><Name>EMAIL_ADDR</Name><br><Value><![CDATA[wood@Hogwarts.edu]]><br></Value><br></MessageArg> |

An exemplary Job Object is as follows:

```
<Job>
    <Message>
        <Subject>Extra Quidditch Practice</Subject>
        <Template>generic</Template>
        <MessageArg>
            <Name>SENDER</Name>
            <Value>Oliver Wood</Value>
        </MessageArg>
        <MessageArg>
            <Name>BODY</Name>
            <Value><![CDATA[
                I have scheduled an extra Quidditch
    practice session before the match with
    Slytherin. Be there Wednesday at 8:00AM sharp.
    ]]>
            </Value>
        </MessageArg>
        <MessageArg>
           <Name>ASK_YESNO_QUESTION</Name>
           <Value>YES</Value>
        </MessageArg>
        <MessageArg>
         <Name><QUESTION_TO_ASK</Name>
            <Value><![CDATA[
                Can you make the practice session?]]>
            </Value>
        </MessageArg>
        <MessageArg>
           <Name>EMAIL_ADDR</Name>
           <Value><![CDATA[
                wood@Hogwarts.edu]]>
            </Value>
        </MessageArg>
    </Message>
    <Contact>
        <FirstName>Harry</FirstName>
        <LastName>Potter</LastName>
        <ContactMethod>
            <Transport>email</Transport>
            <EmailAddress>potter@hogwarts.edu</EmailAdddress>
        </ContactMethod>
    </Contact>
    <DeliveryRequest>
        <ContactMethodRef>
            <LastName>Weasley</LastName>
            <Transport>email</Transport>
        </ContactMethodRef>
    </DeliveryRequest>
</Job>
```

Major Objects—Job—Sub-objects—Delivery Request: the Delivery Request sub-object allows the requester to specify a recipient for a job, as well as to specify delivery options (as fields within the sub-object). The Delivery Request Object may contain a Contact MethodRef sub-object (to refer to a previously created contact method for the recipient) or may instead refer to a Contact sub-object of a Job object (for one-time use of that Contact/Contact Method).

An exemplary Delivery Request sub-object is as follows:

```
<DeliveryRequest>
    <ContactMethodRef>
        <LastName>Potter</LastName>
        <Transport>email</Transport>
        <Qualifier>home</Qualifier>
    </ContactMethodRef>
</DeliveryRequest>
```

The Delivery Request sub-object is also returned by API 145 as a Response. Furthermore, when an existing Job object is retrieved using a Range object lookup (described below), that job's Delivery Requests are also returned.

The Delivery Request sub-object may contain the following fields:

TABLE 15

Job Major Object
Delivery Request Sub-object Fields

| Fields | Description | In/Out | Allowed Values | Example |
| --- | --- | --- | --- | --- |
| DeliveryOptions | Sets the delivery options. | In | standard urgent | <DeliveryOptions>standard</DeliveryOptions> |
| Id | Unique identifier for this Delivery Request | Out | | <Id>kkk224524</Id> |
| EstDuration | Returns length of time, in seconds, that server estimates it will be on the phone during this delivery. | Out | Integer | <EstDuration>80</EstDuration> |
| EstSize | Estimated number of pages in a fax, if it was a fax | Out | Integer | <EstSize>3</EstSize> |
| Status | Returns delivery status of the message for this Delivery Request:<br>Not Sent (This Delivery Request has not yet been delivered.)<br>Sent (This Delivery Request has been successfully delivered.)<br>Failed (The final attempt at delivery failed.)<br>Cancelled (Your Delivery Request was cancelled.)<br>Cancel Pending (Your Delivery Request cancellation is pending.) | Out | Not Sent<br>Sent<br>Failed<br>Cancelled<br>Cancel Pending | <Status>SENT</Status> |
| Details | Gives the following information about the status of the current delivery attempt:<br>Bad Address<br>Delivery Address is unreachable (No further attempts will be made.)<br>No Answer (another delivery may be attempted.)<br>Busy (another delivery may be attempted.)<br>Answering Machine (assumed) (phone message delivered, no further attempts will be made)<br>Answering Machine (phone message delivered, no further attempts will be made)<br>Maximum Delivery Attempts Exceeded (No further attempts will be made.)<br>Acknowledged (message delivered; if phone; the person acknowledged by pressing 1. No further attempts will be made.)<br>Modem (No further attempts will be made.)<br>Hangup (Call was dropped before message could be dropped; may attempt another delivery.)<br>Callback Later (Message recipient elected a later callback, another delivery will be attempted.)<br>Internal Error (internal error encountered, may attempt another delivery.) | Out | See Description | <Details>Modem</Details> |
| Completed | True if no further delivery attempts will be made for this delivery request | Out | true<br>false | <Completed>true</Completed> |

An exemplary Delivery Request Response is as follows:

```
<DeliveryRequest>
        <ID>kztubkkkk</ID>
        <EstDuration>80</EstDuration>
        <Status>Not Sent</Status>
        <DeliveryOptions>Standard</DeliveryOptions>
        <Completed>false</Completed>
        <ContactMethod>
                <ID>kit5bkkuk</ID>
                <Transport>phone</Transport>
                <Qualifier>office</Qualifier>
                <Unreachable>false</Unreachable>
                <EmailAddress>potter@hogwarts.edu</E
                mailAddress>
        </ContactMethod>
        <Contact>
                <ID>kk36bkkkk</ID>
                <Prefix></Prefix>
                <FirstName>Harry</FirstName>
                <MiddleName></MiddleName>
                <LastName>Potter</LastName>
                <Company>Hogwarts School for
                Witchcraft and Wizardry</Company>
                <Title>Student</Title>
                <OneTime>true</OneTime>
        </Contact>
</DeliveryRequest>
```

Major Objects—Job—Sub-objects—Delivery Request—Delivery Sub-object: the Delivery sub-object never appears in a Request. It is returned by API 145 as a sub-object of a Delivery Request object when a Range object lookup (see below) is performed on a job.

The Delivery sub-object may contain the following fields:

TABLE 16

Job Major Object
Delivery Request Sub-object
Delivery Sub-object Fields

| Fields | Description | In/Out | Allowed Values | Example |
|---|---|---|---|---|
| Id | Unique identifier for this Delivery | Out | | <Id>kkk224524</Id> |
| Timestamp | Time delivery was made | Out | Integer | <Timestamp>2000:06:05 04:15:22</Timestamp> |
| Duration | Returns length of time, in seconds, that server was on the phone during this delivery | Out | Integer | <Duration>80</Duration> |
| Status | Returns delivery status of the message for this Delivery: Not Sent (This Delivery has not yet been Sent (This Delivery has been successfully delivered.) Failed (The final attempt at delivery failed.) Cancelled (Your Delivery was cancelled.) Cancel Pending (Your Delivery cancellation is pending.) | Out | Not Sent Sent Failed Cancelled Cancel Pending | <Status>SENT</Status> |
| Details | Gives the following information about the status of this delivery attempt: Bad Address Delivery Address is unreachable (No further attempts will be made.) No Answer (another delivery may be attempted.) Busy (another delivery may be attempted.) Answering Machine (assumed) (phone message delivered, no further attempts will be made) Answering Machine (phone message delivered, no further attempts will be made) Maximum Delivery Attempts Exceeded (No further attempts will be made.) Acknowledged (message delivered; if phone, the person acknowledged by pressing 1. No further attempts will be made.) Modem (No further attempts will be made.) Hangup (Call was dropped before message could be delivered; may attempt another delivery.) Callback Later (Message recipient elected a later callback, another delivery will be attempted.) Internal Error (internal error encountered, may attempt another delivery.) | Out | | <Details>Modem</Details> |
| Size | Number of pages in a fax, if it was a fax | Out | standard urgent | <Size>3</Size> |
| Cost | Actual cost for this delivery in US Dollars | Out | Floating point value | <Cost>18.20</Cost> |

Major Objects—Range: The Range object facilitates retrieval of a list of objects based on specified criteria. In particular, the Range object can retrieve Distribution List, Job, and Contact objects. The Response to a Range object returns the requested objects.

The Range Major Object may contain the following fields:

TABLE 17

Range Major Object Fields

| Fields | Description | In/Out | Allowed Values | Example |
|---|---|---|---|---|
| Object | Specifies the type of object you are trying to look up | In | DistributionList<br>Job<br>Contact<br>Member | \<Object><br>DistributionList<br>\</Object> |
| Type | Specifies criteria for the lookup; depend on the value of \<Object>;<br>Distribution List<br>Job<br>Contact<br>Member | In | If \<Object> value is Distribution List:<br>Name (look up by Name field)<br>Id (look up by Id field)<br>All (return all Dist Lists for this Member)<br>Job:<br>Date (look up by date)<br>Id (look up by Id)<br>All (return all Jobs for this Member)<br>Contact:<br>LastName (look up by LastName field)<br>Id (lookup by Id field)<br>Company (lookup by Company field)<br>All (return all Contacts for this Member)<br>Member:<br>Username (lookup by Username field)<br>Id (lookup by Id field) | \<Type>Name \</Type> |
| Start | Specifies criteria for the data you are looking up; depends on the value of \<Type> | In | String | If \<Type>LastName\</Type><br>Then<br>\<Start>Potter\</Start><br>If \<Type>Date\</Type><br>Then, \<Start>2000:02:14 12:30:00\</Start> |
| End | Specifies the end of a date range; only used if the value of \<Type> is "Date" | In | yyyy:mm:dd hh:mm:ss | \<End>2000:02:14 12:35:00 \</End> |

The Range object is always included in a Request object, with the value of the RequestType set to "lookup." The most common use for the Range object is to look up a Job object by Id, for example,

```
<Range>
    <Object>job</Object>
    <Type>Id</Type>
    <Start>kkky5btk</Start>
<Range>
```

Error Handling: Errors fall into three classes: parsing errors, fatal errors, and errors/warnings encountered while validating any object or field.

Parsing errors occur when the input XML tags do not conform to XML specifications. Typical examples of malformed XML code include tags that are not closed and illegal characters; to avoid the latter type of error, free-form text should be enclosed within CDATA tags. When parsing errors are encountered, API 145 returns a ParseErrors object, which contains one or more sub-objects called ParseError and having the following fields:

TABLE 18

ParseError Sub-object Fields

| Fields | Description | In/Out | Allowed Values | Example |
|---|---|---|---|---|
| ErrorString | Text explaining the error | Out | String | \<ErrorString>Expecting 'a name', found '?'\</ErrorString> |
| LineNumber | Line number where error found | Out | Integer | \<LineNumber>0\</LineNumber> |

An example is as follows:

```
<ParseErrors>
    <ParseError>
        <ErrorString>Expecting 'a name', found '?' ,/ErrorString>
        <LineNumber>9</LineNumber>
    </ParseError>
</ParseErrors>
```

A fatal error signifies a significant problem encountered in the course of processing a Request. API 145 returns a FatalError object with a single field (ErrorString), which indicates the nature of the error. For example,

```
<FatalError>
    <ErrorString>User Transaction Server Unavailable.</ErrorString>
</FatalError>
```

Validation errors and warnings are attached to problematic objects or fields as "attributes." The Errors and Warnings fields of a Response object contain the following information:

TABLE 19

Response Super Object Errors and Warnings Fields

| Fields | Description | In/Out | Allowed Values | Example |
|---|---|---|---|---|
| Errors | Set to the number of errors discovered while processing the major objects included in the Request | Out | Unsigned integer | <Errors>2</Errors> |
| Warnings | Set to the number or warnings (a less severe error) discovered while processing the major objects included in the Request | Out | Unsigned integer | <Warnings>1</Warnings> |

For example, if a Request contains an invalid telephone number, a warning attribute will be attached to the problematic <PhoneNum> field. If a Request fails to provide a Billing sub-object when trying to add a Member, an error attribute will be attached to the Member object.

It will therefore be seen that the foregoing represents a full-featured messaging system capable of operating in multiple communication modes and interacting with remote applications through a common, extensible interface. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. Apparatus comprising:
    a messaging application program interface (API) comprising a message and designation receive mechanism to receive, from remote enterprise applications via a network connection, messages and corresponding designations, individual ones of the corresponding designations comprising destination information identifying (i) a set of multiple human recipients and (ii) different modalities for transmitting the messages to respective ones of the multiple human recipients;
    the message and designation receive mechanism being configured to receive the messages and the corresponding designations from plural sender computers, wherein each of the plural sender computers comprises a message compose mechanism to compose at least one of the messages and compose at least one of the corresponding designations;
    the API further comprising a messaging facility direction mechanism to direct a messaging facility to effect transmission of each of the messages to their corresponding destinations in accordance with their corresponding designations.

2. The apparatus according to claim 1, wherein the messages include a given message that comprises all content of a message to be delivered.

3. The apparatus according to claim 2, futher comprising a network interface configured to compile the remote enterprise applications to the messaging facility via the Internet.

4. The apparatus according to claim 3, wherein the API comprises an API portion of a messaging facility processing platform.

5. The apparatus according to claim 4, wherein the messaging facility processing platform comprises a server.

6. The apparatus according to claim 4, wherein the network connection comprises an Internet connection.

7. The apparatus according to claim 6, wherein the Internet connection is part of the network interface forming part of the messaging facility processing platform.

8. The apparatus according to claim 7, wherein the messaging facility processing platform comprises a server.

9. The apparatus according to claim 8, wherein the different modalities comprise, for each individual recipient of the set of multiple recipients, a set of corresponding modalities for transmitting the message to the individual recipient.

10. The apparatus according to claim 9, wherein the different modalities comprise at least two of email, fax, voice telephone and pager.

\* \* \* \* \*